W. L. BLISS.
BELT GUARD FOR PULLEYS.
APPLICATION FILED SEPT. 18, 1914.

1,296,259.

Patented Mar. 4, 1919.
2 SHEETS—SHEET 1.

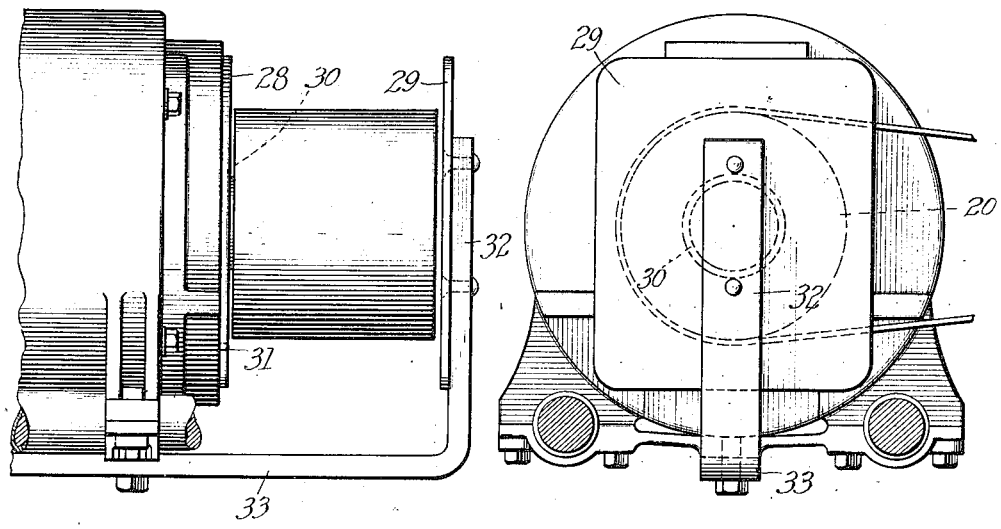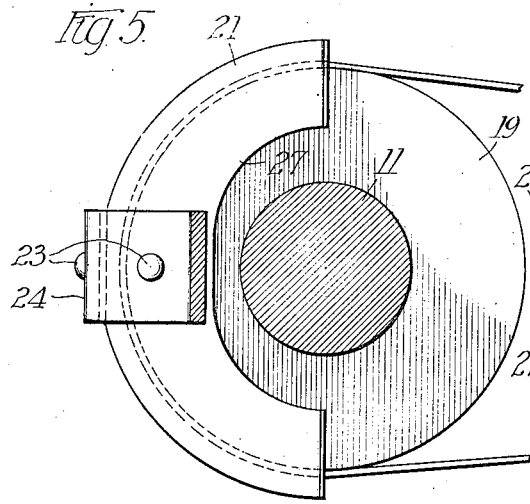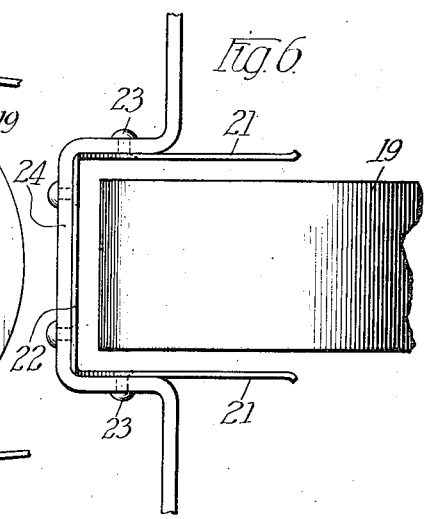

UNITED STATES PATENT OFFICE.

WILLIAM L. BLISS, OF NIAGARA FALLS, NEW YORK, ASSIGNOR, BY MESNE ASSIGNMENTS, TO U. S. LIGHT & HEAT CORPORATION, OF NIAGARA FALLS, NEW YORK, A CORPORATION OF NEW YORK.

BELT-GUARD FOR PULLEYS.

1,296,259.　　　Specification of Letters Patent.　　Patented Mar. 4, 1919.

Application filed September 18, 1914. Serial No. 862,320.

*To all whom it may concern:*

Be it known that I, WILLIAM L. BLISS, a citizen of the United States, residing at Niagara Falls, in the county of Niagara and State of New York, have invented new and useful Improvements in Belt-Guards for Pulleys, of which the following is a full, clear, concise, and exact description, reference being had to the accompanying drawing, forming a part of this specification.

My invention relates to belt guards for pulleys.

Electric car lighting equipments for railway cars are generally of the type in which a generator, mounted on the car truck, is driven by means of a belt passing over a pulley on the armature shaft of the generator and a driving pulley on the car axle. Heretofore the driving belts of axle driven generators have been retained on their pulleys by flanges formed integral with the pulleys. There is a tendency under certain conditions of service, for the belt to climb and ride over the flanges.

An object of the present invention is to provide means for retaining the driving belt of an axle driven generator on its pulleys.

Other objects of my invention will hereinafter appear.

An embodiment of the invention is illustrated in the accompanying drawings. In the drawings—

Fig. 3 is a front view of the pulley end of the generator.

Fig. 4 is an end view of the same.

Fig. 5 is an end view of the axle pulley.

Fig. 6 is a top view of the same.

Figure 1:
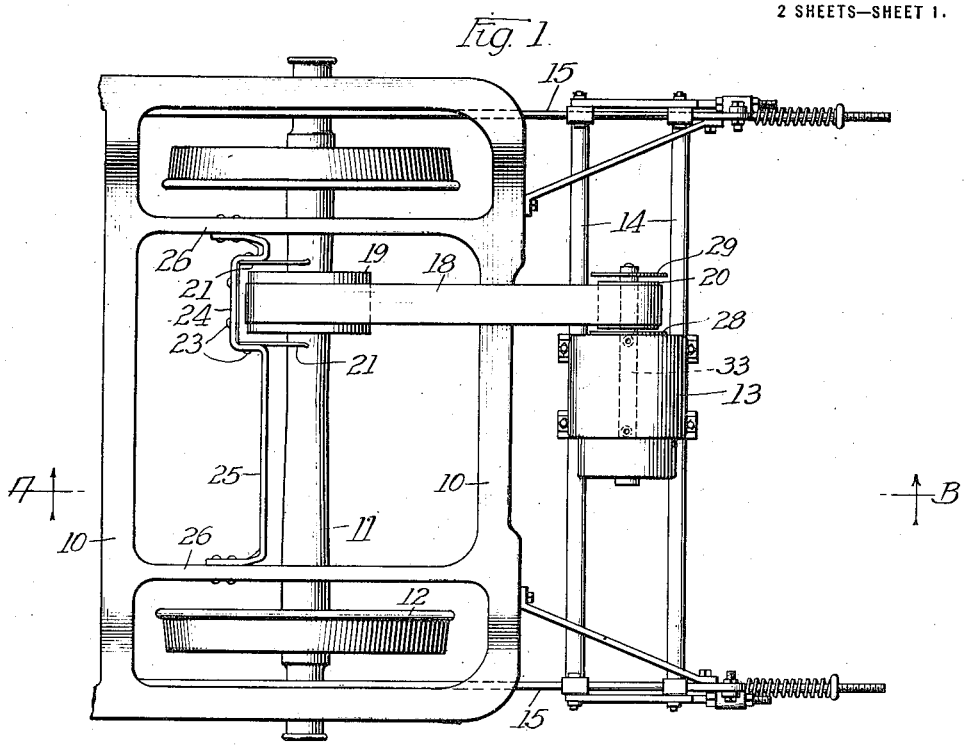
Figure 1 is a plan of a car truck and an axle driven generator thereon.
Figure 2:
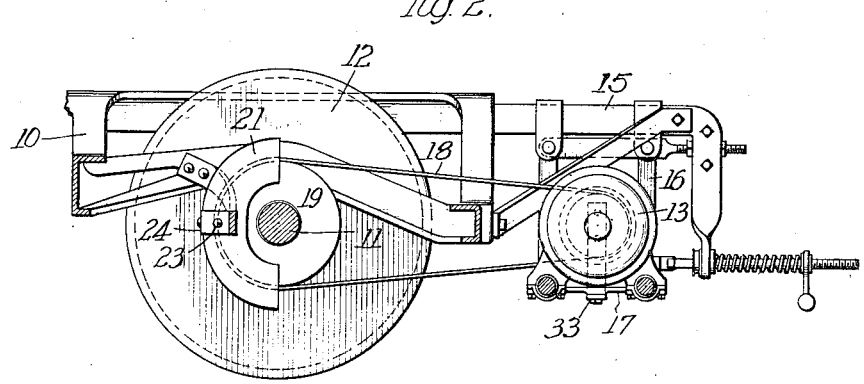
Fig. 2 is a longitudinal section on the line A—B of Fig. 1.

Figs. 1 and 2 illustrate a car truck 10, carried by car axles 11, mounted on wheels 12. A car lighting generator 13 is carried by a suspension 14 mounted on the truck.

The suspension includes a pair of substantially parallel suspension bars 15 projecting beyond one end of the truck, supporting a pair of U-shaped slings 16, upon which the generator is mounted. The generator is secured to the slings by foot-caps 17, and is driven from the car axle by a belt 18, running from the pulley 19 on the car axle to the pulley 20 on the armature shaft. Both the axle pulley and the armature pulley are of the flangeless type.

Figs. 5 and 6 illustrate in detail the guard for holding the belt on the axle pulley. The guard includes two flat semi-circular members 21, arranged one on each side of the pulley and parallel with the pulley heads. These members extend beyond the tread of the pulley to form stationary flanges, so that any tendency of the belt to run off the tread of the pulley is immediately checked thereby. The flanges are formed integral with a connecting brace 22, and are secured by bolts 23 to the upwardly bent portion 24 on a rod 25, which extends from one of the wheel guards 26 to the other. Each of the flanges 21 has a substantially semi-circular portion 27 cut away, so as to avoid interference with the vertical movement of the axle. They are spaced far enough from each side of the pulley to permit the necessary end play of the axle.

Figs. 3 and 4 illustrate the guard for the armature pulley 20. The guard includes disk-shaped plates 28, 29, arranged one on each side of the pulley and parallel with the pulley heads. The plates are made of greater diameter than the pulley, so that their peripheries extend beyond the tread thereof to provide flanges which serve to check any tendency of the driving belt to run off the pulley. The plate 28 has a central circular opening 30 to permit it to be passed over the armature shaft. It is secured to the side of the generator casing by suitable studs 31. If desired, the generator casing may be formed with a flat circular end adapted to take the place of the plate 28. The plate 29 is secured to the upwardly extending arm 32 of an L-shaped bracket 33, secured to the foot-caps of the generator.

This improved construction provides a guard which will effectively hold the driving belt on the tread of its pulleys under all service conditions. Even the presence of snow and ice, when encountered in winter service, will not impair the efficiency of the apparatus.

Another advantage of my improved construction is that where the clearance with the truck, brake-beam and center sill is important, the absence of the flanges on the pulley permits of a pulley of greater diameter than could be used if the flange type were employed.

The embodiment of my invention described herein has been selected merely for the purpose of illustration. My invention covers all equivalent means for accomplishing the desired results, so long as such means fall within the scope of the appended claim.

Having thus described my invention, what I claim as new and desire to secure by Letters Patent of the United States is:—

The combination of a truck including an axle mounted thereon having a flangeless pulley, a guard for said pulley, and supporting means for said guard having extremities extending away from said guard in opposite directions for attachment to adjacent parts of the truck frame.

In witness whereof, I have hereunto subscribed my name in the presence of two witnesses.

WILLIAM L. BLISS.

Witnesses:
  L. S. CONNRY,
  F. H. ZELLHOEFER.